(12) United States Patent
Sankaralingam et al.

(10) Patent No.: US 9,384,016 B2
(45) Date of Patent: Jul. 5, 2016

(54) METHOD OF ESTIMATING PROGRAM SPEED-UP WITH HIGHLY PARALLEL ARCHITECTURES

(71) Applicant: Wisconsin Alumni Research Foundation, Madison, WI (US)

(72) Inventors: Karthikeyan Sankaralingam, Madison, WI (US); Newsha Ardalani, Madison, WI (US); Xiaojin Zhu, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 63 days.

(21) Appl. No.: 14/212,711

(22) Filed: Mar. 14, 2014

(65) Prior Publication Data

US 2015/0261536 A1 Sep. 17, 2015

(51) Int. Cl.
| | |
|---|---|
| G06F 3/00 | (2006.01) |
| G06F 19/00 | (2011.01) |
| G06F 9/445 | (2006.01) |
| G06F 9/54 | (2006.01) |
| G05B 23/02 | (2006.01) |
| G06F 9/45 | (2006.01) |

(52) U.S. Cl.
CPC ........ *G06F 9/44505* (2013.01); *G05B 23/0294* (2013.01); *G06F 8/443* (2013.01); *G06F 9/54* (2013.01)

(58) Field of Classification Search
CPC ...... G06F 9/54; G06F 9/3867; G05B 23/0291
USPC .......................................... 719/310; 700/108
See application file for complete search history.

(56) References Cited

U.S. PATENT DOCUMENTS

| | | | |
|---|---|---|---|
| 8,700,925 B2* | 4/2014 | Wyatt | 713/300 |
| 2011/0310107 A1* | 12/2011 | Shiraki | G06T 1/20 345/502 |
| 2012/0221573 A1* | 8/2012 | Wunsch et al. | 707/737 |
| 2014/0109105 A1* | 4/2014 | Lee | G06F 9/505 718/105 |
| 2015/0007187 A1* | 1/2015 | Shows | 718/104 |
| 2015/0052536 A1* | 2/2015 | Sah | 718/105 |

OTHER PUBLICATIONS

Hiroaki Hirata, A Elementary Processor Architecture with Simultaneous Instruction Issuing from Multiple Threads, 1992.*
Liu et al.; Performance Prediction for Reconfigurable Processor; in High Performance Computing and Communication 2012 IEEE 9th International Conference on Embedded Software and Systems (HPCC-ICESS), 2012 IEEE; 14th International Conference; pp. 1352-1359, 2012.
Hoste et al.: Performance Prediction based on Inherent Program Similarity; in PACT, pp. 114-122. ACM Press, 2006., US.

* cited by examiner

*Primary Examiner* — Lechi Truong
(74) *Attorney, Agent, or Firm* — Boyle Fredrickson, S.C.

(57) ABSTRACT

The amount of speed-up that can be obtained by moving a program to a parallel architecture is determined by a model associating speed-up to micro-architecture independent features of the program execution. The model may be generated, for example, by linear regression, by evaluating programs that have been ported to parallel architectures where the micro-architecture independent features are known.

21 Claims, 2 Drawing Sheets

METHOD OF ESTIMATING PROGRAM SPEED-UP WITH HIGHLY PARALLEL ARCHITECTURES

STATEMENT REGARDING FEDERALLY SPONSORED RESEARCH OR DEVELOPMENT

This invention was made with government support under 1162215 and 0953219 awarded by the National Science Foundation. The government has certain rights in the invention.

CROSS REFERENCE TO RELATED APPLICATION

Background of the Invention

The present invention relates to highly parallel computer architectures such as graphic processing units (GPUs), and in a particular to a method of estimating the degree by which a program will speed-up when ported to a highly parallel architecture, for (maniple, from a different architecture.

Current high-performance computers may employ at least two processor systems having substantially different architectures. The first processor system may be in the form of one or more CPUs (computer processing units) each having a general instruction set intended for serial execution of tasks and the second processor system may be a GPU (graphics processing unit) having many hundreds of processing elements and a specialized instruction set intended for parallel execution of tasks, typically associated with graphics processing.

The ability of the GPU to handle not only graphic tasks but also generalized computational tasks that can be parallelized, for example, by stream processing, has led to a so-called "heterogeneous processing" in which the GPU handles non-graphics program tasks normally performed by the CPU.

Some programs can experience multiple factors of "speed-up" when moved ("ported") from the CPU to a GPU. Porting a program from a CPU to a GPU however, requires substantial restructuring of the software and data organization to match the GPUs many-threaded programming model. Code optimization of such ported programs can be very time-consuming and require specialized tools and expertise.

The costs of porting programs to a GPU make it desirable to know if program speed-up will justify the effort before substantial effort is expended. Unfortunately, the performance advantage of such porting is not known until the GPU code has been written and optimized

SUMMARY OF THE INVENTION

The present invention provides a method of estimating the amount of speed-up that will be obtained in porting a program between two different computer architectures, for example, between a CPU and GPU. The ability to make such an estimate required a determination that execution speed could be accurately modeled by observing micro-architecture independent features of a set of unrelated programs that had been successfully ported.

In one embodiment the invention provides an electronic computer executing a program to measure multiple quantifiable execution properties of a given program to be evaluated, the multiple quantifiable execution properties describing how the given program executes on a first processor system. The measured quantified execution properties are applied to a model relating the measured quantified program properties to a change in execution speed when the given program is executed on a second processor system having a different architecture than the first processor system. This change in execution speed is used to provide an output indicating an expected execution speed of the given program on the second processor system.

It is thus a feature of at least one embodiment of the present invention to provide a method of assessing the benefits of porting a program to a different architecture before the effort and cost of porting that program are undertaken.

The measured quantified execution properties may be substantially independent of the micro-architecture of the first and second processors.

It is thus a feature of at least one embodiment of the present invention to provide measures that may be input into the model that can be automatically extracted during execution of the program without detailed instrumentation or understanding of the micro-architecture of the computer systems.

The measured multiple quantified execution properties may include a measure of instruction level parallelism in the program to be evaluated, a measure of branch divergence within windows of the program to be evaluated, or a measure of utilization of special functions available in only one of the two processor architectures.

It is thus a feature of at least one embodiment of the present invention to identify readily measurable execution features of the programs that relate strongly to program speed-up.

The multiple quantified execution properties may be measured during execution of the program to be evaluated on the first processor system.

It is thus a feature of at least one embodiment of the present invention to provide a system that may work with a wide variety of different processors and programs by characterizing the program with its native processor.

The electronic computer may include the first processor system and the second processor system and the program may further execute a series of training set programs on the first and second processor systems, the training set of programs including corresponding pair portions optimized for different ones of the first and second processor system yet providing similar functions. During that execution, a change in execution speed between the corresponding pair portion when executed respectively on the first and second different processor system is determined and the multiple quantifiable execution properties of each corresponding pair portion measured. The model is then generated by relating the change in execution speed to the multiple quantified execution properties.

It is thus a feature of at least one embodiment of the present invention to closely match the native and target computer systems to the model by executing the model training set on the actual computer processing systems involved. The model may then be generated only after measuring the training set programs on the specific computer systems.

The multiple quantified program properties of corresponding pair portions are substantially the same, and are substantially different for different pair portions.

It is thus a feature of at least one embodiment of the present invention to provide a training set that can provide the basis of a strong model.

The model may be generated by linear regression and may use regularized regression.

It is thus a feature of at least one embodiment of the present invention to provide at least one modeling technique demonstrated to provide the necessary accuracy for speed-up estimation.

The first processor system may be a general-purpose CPU and the second processor system is a specialized GPU.

It is thus a feature of at least one embodiment of the present invention to provide a system that assists in evaluating heterogeneous processing on GPUs.

These particular objects and advantages may apply to only some embodiments falling within the claims and thus do not define the scope of the invention.

DETAILED DESCRIPTION OF THE PREFERRED EMBODIMENT

Figure 1:
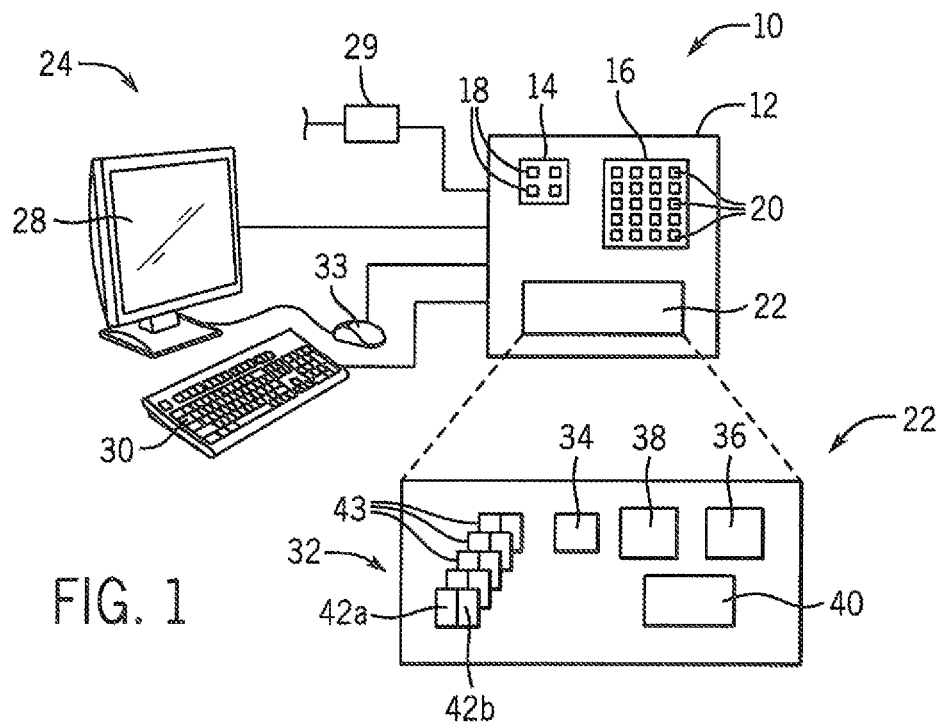
FIG. 1 is a block diagram of a heterogeneous processor that may execute a program for practice of the present invention.

Referring now to FIG. 1, processor system 10 suitable for use with the present invention may include a heterogeneous processor 12 providing generally for a CPU system 14 and a GPU system 16. As is understood in the art the CPU system 14 may have one or more cores 18 (for example, eight) each of which may execute a general instruction set intended for the execution of serially executed programs. These cores 18 may include current architectural features such as speculative execution, out of order execution and the like.

In contrast to the CPU system 14, the GPU system 16 will provide an architecture presenting a much larger number of computational elements 20 (for example, 100) each executing a specialized instruction set, for example, suitable for graphic processing. The computational elements 20 are configured for vector processing as opposed to the scalar processing intended for the CPU system 14.

The heterogeneous processor 12 may further include a memory system 22 providing data and programs for execution on the CPU system 14 and GPU system 16 as will be discussed below. The memory system 22 may broadly include cache memories, high-speed random-access memory, and lower speed disk drives and the like. In addition, the heterogeneous processor 12 may communicate with external devices 24, for example, a standard user interface of a graphic display screen 28, keyboard 30, cursor control device 33, and a network interface 29.

The memory system 22 may hold a training set 32 of programs that can be executed on both the CPU system 14 and GPU system 16 as will be discussed further below together with a subject program 34 to be tested for speed-up potential. The process of testing subject program 34 is undertaken by an evaluation program 36 and profiling program 38 whose operation also will be described below. Each of these programs will generally execute wider the environment of an operating system 40 as will be understood to those of ordinary skill in the art.

The training set 32 consists of multiple pairs 43 of program portions 42a and 42b. Each program portion 42a and 42b has been optimized to run on different of the CPU system 14 and GPU system 16 but accomplish generally the same function. The optimization of the programs for the different CPU system 14 and GPU system 16 will typically be done manually and these programs culled from published examples.

In one embodiment, both program portions 42a and 42b may be written in C or a variant (e.g., C++) and the algorithm used in each of the program portions 42a and 42b may be similar or identical. The program portions 42a and 42b will be portions of larger programs where sections of the program portion 42a are ported for execution on the GPU system 16. Ideally, however, program portion 42a will have well-defined regions that map to well-defined regions of program portion 42b and these regions will comprise the training sets. In one embodiment a training set 32 of approximately twenty pairs 43 is collected, each pair 43 implementing a different function.

In one embodiment the following programs are used as pan of the training set 32: [capp] fft1: 9.1, histogram: 3.2, lbm: 3.7, montecarlo2: 21.3, saxpy: 6.8, sgemm2: 102.8, spiny: 3.9, tsearch: 29.7, [Parboil] 1 bm1: 29.6, mri-q1: 0.3, mri-q2: 2053.2, sad2: 9.1, sgermm1: 21.4, spmv1: 0.5, stencil1: 44.6, tpacf1: 0.1, histo1: 0.8, cutcp1: 98.4, [Rodinia] backprop1: 12.1, backprop2: 25.8, bfs2: 21.5, b+tree1: 11.8, b+tree2: 13.3, euler3d1: 11.5, euler3d4: 6.8 heartwall1: 21.5, kmeans1: 322.7, leukocyte1: 217.2, leukocyte2: 55.4, leukocyte3: 59.5, murnmergpu2: 21.3, myocyte1: 4.7, needle1: 10.1, particle_filter1: 1.1, srady12: 1.4, srad_y14: 5.9, srad_v15: 153.0, srad_v21: 653.0, sc1: 2.3. The numbers after each set indicte the speedup on one CPU/GPU pairing.

Figure 2:
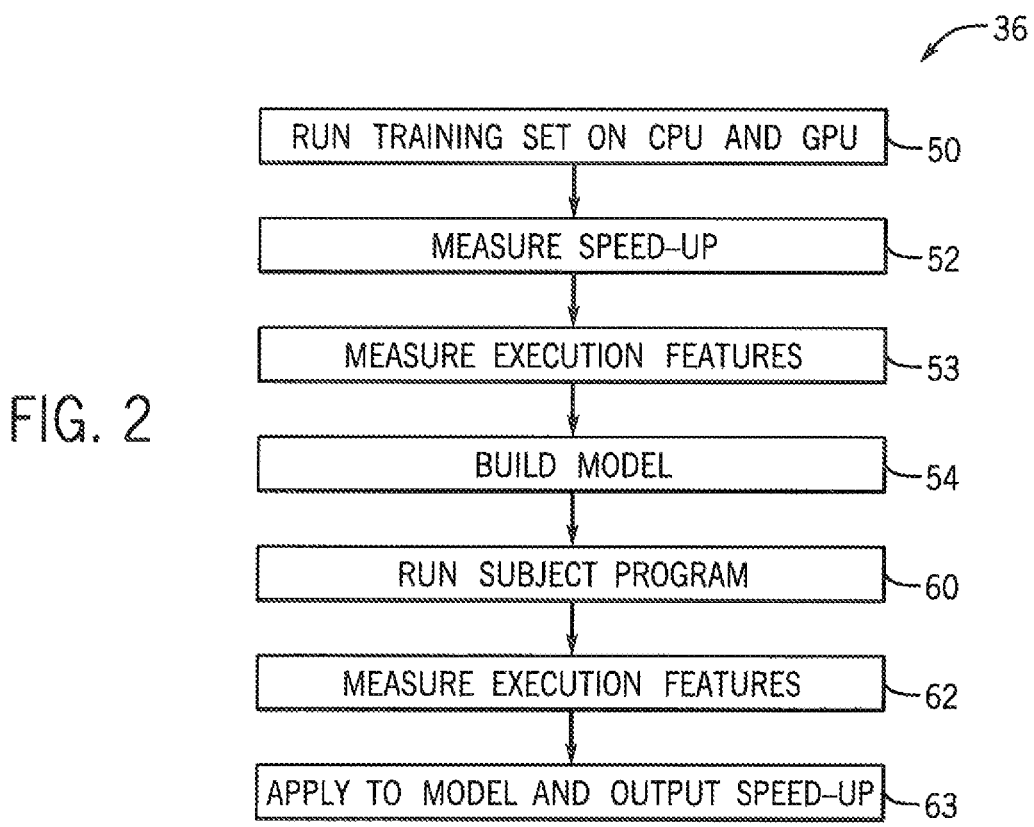
FIG. 2 is a flowchart of the principal steps of a program as may be executed on the heterogeneous processor of FIG. 1.

Referring now to FIG. 2, program 36 executes to evaluate possible speed-up of the subject program 34. The subject program 34 will normally have been compiled for an execution on a "native system" (typically the CPU system 14) but may have alternatively been compiled for execution on a different system having similar architecture, for example, another scalar type computer.

In preparation for this evaluation, the program 36 executes the training set 32 on both a native system and a target system, in this example the CPU system 14 and GPU system 16, respectively, as indicated by process block 50. So, for example, program portions 42a of each pair 43 will be executed by the CPU system 14 and program portion 42b will be executed by the GPU system 16. This process is repeated for each pair 43.

During the execution of each pair 43, profiling program 38 monitors the execution time for the particular program portion 42a and 42b running on its respective system and determines a speed-up value as indicated by process block 52. The speedup value is the change in execution time (for example a difference or ratio) between the program portions 42a and 42b (executed on their respective systems), divided by the execution time of program portion 42a (on the native system) to normalize this quantity to speed-up rather than execution speed. Other measures of speed-up including execution speed are also contemplated as possible.

During the execution of each program pair 43 described above or at a prior time, the profiling program 38 may also evaluate micro-architecture independent features of the execution of each program portion 42 of the program pair on its respective native or target processor system. This evaluation is indicated by process block 53. Generally micro-architecture independent features are those which can be observed during operation of the processor system without modification of processor system hardware. Examples of micro-architecture independent features are provided below.

In measuring speed-up time and the micro-architecture independent features, profiling program 38 may use the PIN program described in Chi-Keung Luk et al. "Pin: Building Customized Program Analysis Tools with Dynamic Instrumentation", Proceedings of the 2005 ACM SIGPLAN Conference on Programming Language Design and Implementation (PLDI), pages 190-200, June 2005.

The invention contemplates that a wide variety of different micro-architecture independent features may be used but has identified some which appear to provide robust modeling. Example micro-architecture independent features are described in K. Hoste and L. Eeckhout, "Comparing benchmarks using key micro-architecture-independent characteristics", Workload Characterization, 2006 IEEE International Symposium on, pages 83-92, 2006.

Generally the micro-architecture independent features include measures such as number of independent operations in a given program window size, fraction of memory operations, control operations, integer arithmetic operations, and floating-point operations. A more comprehensive table of micro-architecture independent features is provided below as Table I:

TABLE I

| Micro-architecture Independent Characteristic Name | Range | Description | Relevance for GPU speedup |
|---|---|---|---|
| ilp.(25; 28; 211; 216) | 1 - Window-size | Number of independent operations in window size; Window sizes of (25; 28; 211; 216) examined. Independent operations are those which can be executed simultaneously without memory conflicts | Captures the exploitation of instruction level parallelism possible in certain GPUs |
| mem | 0%-100% | Fraction of total operations that are memory access operations | Captures weakness in GPUs of memory operations |
| ctrl | 0%-100% | Fraction total operations that are flow control operations | Captures weakness of GPUs in flow control operations |
| arith | 0%-100% | Fraction of total operations that are integer arithmetic operations | Captures strength of GPUs in integer arithmetic operations |
| fp | 0% 100% | Fraction of total operations that are floating-point operations | Captures weakness of GPUs and floating-point operations? |
| locStride; (0, 8, 128, Other); | 0 to 1 | For b in (0, 8, 128, and other); consider two consecutive instances of a static load/store. probability that the difference in address is (0, 1 to 8, 9 to 128, above 128). | Memory coalescing effectiveness (within warp) (bad for GPUs) |
| gStride(0, 8, 128, Other) | 0 to 1 | Similar to locStride but for consecutive instances of any load/store | Memory coalescing effectiveness (across warps) |
| memInt | 0 to 1 | Number of unique memory blocks (64 byte) per dynamic instruction executed | Captures locality and shared memory effectiveness |
| pages | 0 to 1 | Above at 4 KB granularity | Captures locality and shared memory effectiveness |
| coldRef | 0%-100% | Fraction of memory references that are cold misses | Captures GPU suitability for streaming applications |
| reuseDist | 40%-100% | Fraction of memory references that their reuse distance is less than 4 | Captures the cache effect |

The present inventors have supplemented this list with some additional micro-architecture independent properties listed in the following Table II:

TABLE II

| Micro-architecture Independent Characteristic Name | Range | Description | Relevance for GPU speedup |
|---|---|---|---|
| ilpRate | 1-16384 | Instruction level parallelism growth rate when window size changes from 32 to 16384 | Captures amenability to GPU's many-threaded model by capturing distant parallelism across loop iterations |
| mul | 0%-100% | Fraction of total operations that are multiplication operations | Captures GPUs abundant multiplication units |
| div | 0%-100% | Fraction of total operations that are division operations | Captures GPUs more/efficient division units |
| rem | 0%-100% | Fraction of total operations that are remainder operations | Captures GPUs more/efficient remainder operations |
| spf | 0%-100% | Fraction of total operations that are special function operations performed only by the GPU | Captures the GPU Special Function Units effect |
| Lbdiv.($2^4$-$2^{10}$) | 0%-100% | Consider local branch history per branch instruction, and a sliding observation window of size W, For W in ($2^4$-$2^{10}$), calculate the fraction of windows that branches within them are not going in the same direction | Captures branch divergence effect |
| Gbdiv($2^2$-$2^{10}$) | 0%-100% | Same as above but with global branch history for all branch instructions | Captures branch divergence effect |

Figure 3:
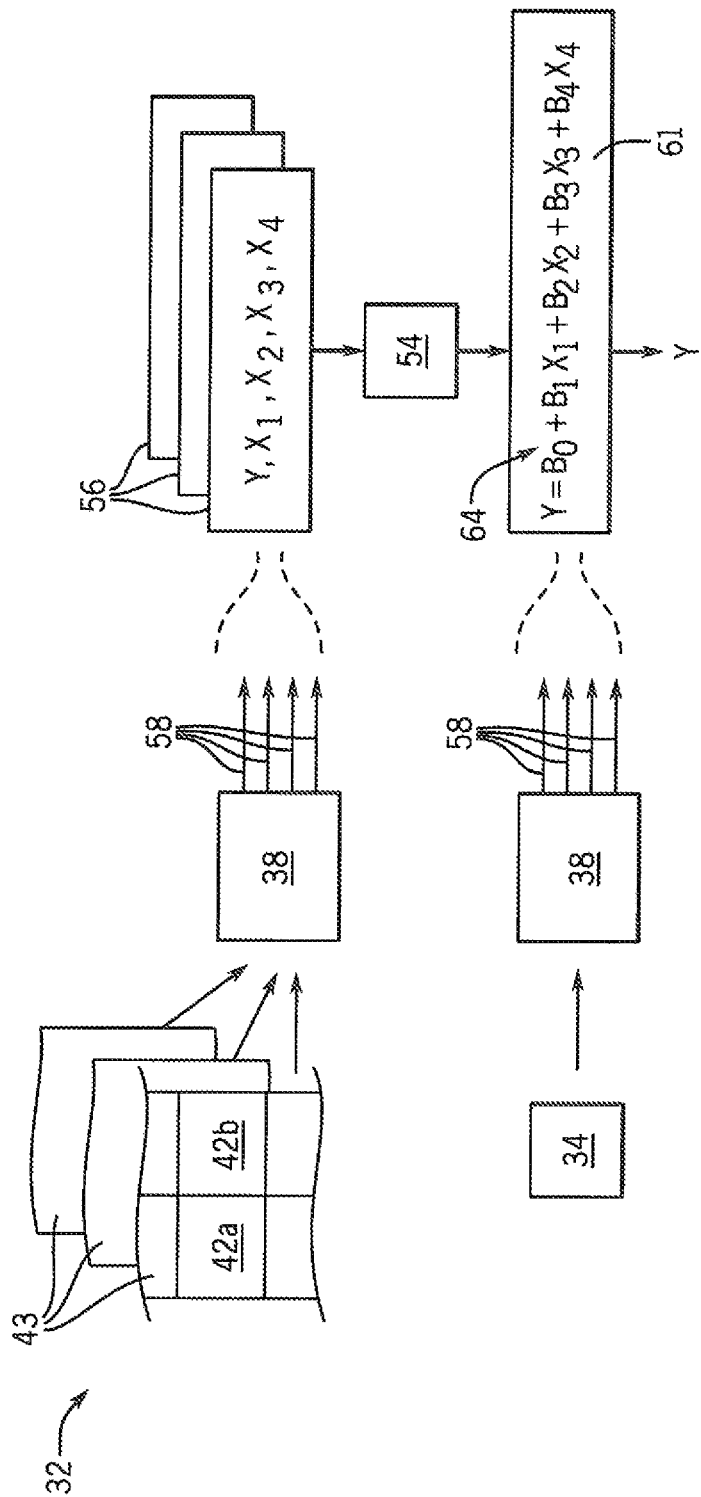
FIG. 3 is a data flow diagram of the modeling process used in the program of FIG. 2.

Referring now to FIG. 3, for each of these micro-architecture independent features 58 measured by the profiling program 38 from the training set 32, a preferred embodiment uses the characteristics of: ilpRate, spf, Lbdiv. ($2^4$-$2^{10}$) and Gbdiv($2^2$-$2^{10}$). Each of these measurements of each of these characteristics generates for each pair 23 a vector 56:

$$y_i, x_{1i}, x_{2i}, x_{3i}, x_{4i} \quad (1)$$

where $y_i$ is the speed-up obtained in a given program pair 43 and $x_{ji}$ are the four measured properties described above. Generally it will be understood that this vector need not be limited to four measured properties.

The vectors obtained with each of the program pairs 43 of the training set 32 is then used to build a model as indicated by process block 54. Generally the modeling process uses the vectors to determine a modeling function 64 of the form:

$$y_i = B_0 + B_i x_{1i} + B_2 x_{2i} + B_3 x_{3i} + B_4 x_{4i} \quad (2)$$

More generally, the model may have interacting terms and higher order terms as follows:

$$yi = B_0 + B_1 {}^* x_{1i} + B_2 {}^* x_{2i} + B_3 {}^* x_{3i} + B_4 {}^* x_{4i} + B_5 {}^* x_{1i} {}^* x_{2i} + B_6 {}^* x_{1i} {}^* x_{3i} \ldots$$

In this respect, modeling of process block 54 determines the coefficients B that best match the relationship of the multiple vectors and function (2) forms a model 61.

In one embodiment, this function of the model (2) is generated by a linear regression process with exhaustive feature selection and repeated random sub-sampling validation. In particular, regularized regression for these four properties described above may be performed using the LASSO described at Tibshirani, R. (1996), "Regression shrinkage and selection via the lasso", J. Royal. Statist. Soc B., Vol. S 1, pages 267-288. The invention contemplates that the model may be created by other machine-learning techniques.

Some guidelines for creating the model are provided in Table III below:

TABLE III

| Modeling Technique | Description | Pros (+) and Cons (−) |
|---|---|---|
| Simple linear regression | Consider all features and minimize for root square error (RSE) | +Simple<br>−Too many features, too little training data<br>−RSE too high, poor accuracy |
| LASSO | LASSO with all features | +Provides list of features to consider<br>−By itself poor accuracy<br>−Too aggressive in eliminating features |
| Exhaustive feature selection | Exhaustive feature selection, higher-order powers, all interactions, and minimize RSE | +Excellent model for training data<br>−Overfitting and poor accuracy for test data |
| Exhaustive feature selection and repeated random sub-sampling validation | Exhaustive feature selection, higher-order powers, all interactions, and relax RSE minimization, and repeated random sub-sampling validation while building model | +Good model,<br>−Longer run-time (about 30 minutes) |

Once the values of these coefficients B for model 61 have been determined for the training set 32 executing on the native and target systems (e.g. CPU system 14 and GPU system 16) then at process block 60 the subject program 34 is run on the native processor to extract for the subject program 34 the same measures of the micro-architecture independent features (per process block 62 of FIG. 2) to produce a vector:

$$x_{1t}, x_{2t}, x_{3t}, x_{4t} \quad (3)$$

for the subject program 34.

This vector is applied to the model 61 to produce an output value of $y_L$ being a predicted speed-up. The output value $y_t$ may be, for example, displayed on the graphic display screen 28 per process block 63 (shown in FIG. 2). Notably this output value is obtained without actual porting of the subject program 34 to the target of the GPU system 16.

The invention also contemplates establishing a central clearinghouse, for example, on the web, where submitting individuals can submit training set data in a manner that furthers the modeling accuracy of the present invention without revealing the actual ported code developed by the submitting individuals. Under this procedure, a submitting individual who has successfully ported CPU code may submit the Imported program portions together with the realized speed up, y. Users wishing to use this material for building a model at process block 54 (FIG. 3), may run the submitted imported program to establish the execution features of process block 53 and take the resulting vector (e.g. $x_{1i}$, $x_{2i}$, $x_{3i}$, $x_{4i}$) and splice it to the value of speed-up ($y_i$) obtained by the submitting individual to provide the necessary information for building a model at process block 54.

Generally it should be appreciated that the present invention has established the possibility of preparing a reasonably representative training set, identifying features that can be applied to machine learning to successfully produce a model, and dealing with the lack of large training sets.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An electronic computer executing a program stored in non-transient medium to:
    (a) measure multiple quantifiable execution properties of a given program to be evaluated describing how the given program executes on a first processor system subject to a first optimization for the first processing system;
    (b) apply the measured quantified execution properties to a model relating the measured quantified program properties to a value indicating a change in execution speed when the given program is subject to a second optimization different from the first optimization changing the program for a second processing system instead of the first processing system and executed on the second processor system having a different architecture than the first processor system; and
    (c) before the second optimization of the given program for the second processing unit, use the model to output to a user, an indication of expected execution speed of the given program on the second processor system;
    wherein the first processor system and the second processor system have different architectures characterized by different numbers of processing units and different types of processing units wherein the program cannot run on the second system without the second optimization;
    wherein the model is derived from (1) a series of training set programs executable on the first and second processor systems, the training set of programs including corresponding pair portions optimized for different ones of the first and second processor system yet providing similar functions and (2) a determination of both of a change in execution speed between the corresponding pair portion when executed respectively on the first and second different processor systems and the multiple quantifiable execution properties of each corresponding pair portion.

2. The electronic computer of claim 1 wherein the measured quantified execution properties are substantially microarchitecture independent with respect to the first and second processors.

3. The electronic computer of claim 2 wherein the measured multiple quantified execution properties include a measure of instruction level parallelism in the program to be evaluated.

4. The electronic computer of claim 2 wherein the measured multiple quantified execution properties include a measure of branch divergence within windows of the program to be evaluated.

5. The electronic computer of claim 2 wherein the measured multiple quantified execution properties include a measure of utilization of special functions available in only one of the two processor architectures.

6. The electronic computer of claim 2 wherein the multiple quantified execution properties are measured during execution of the program to be evaluated on the first processor system.

7. The electronic computer of claim 1 wherein the electronic computer system includes the first processor system and the second processor system and wherein the program further includes the steps of:
    executing a series of training set programs on the first and second processor systems, the training set of programs including corresponding pair portions optimized for different ones of the first and second processor system yet providing similar functions;
    determining, a change in execution speed between the corresponding pair portion when executed, respectively, on the first and second different processor systems;
    measuring the multiple quantifiable execution properties of each corresponding pair portion; and
    generating the model by relating the change in ex bon speed to the multiple quantified execution properties.

8. The electronic computer of claim 7 wherein the multiple quantified program properties of different pair portions have substantially different values.

9. The electronic computer of claim 7 wherein a model is generated by linear regression.

10. The electronic computer of claim 9 wherein the linear regression uses regularized regression.

11. The electronic computer of claim 7 wherein the electronic computer further executes the program to perform the steps of:
    receiving data on a change in execution speed between corresponding pair portions of a given additional program when executed, respectively, on the first and second different processor systems and only the portion of the pair of the given program optimized for execution on the first processor system;

measuring the multiple quantifiable execution properties of the portion of the pair of the given program optimized for execution on the first processor system; and generating the model by relating the change in execution speed to the multiple quantified execution properties of the given program.

12. The electronic computer of claim 1 wherein the first processor system is a general-purpose CPU and the second processor system is a specialized GPU.

13. A method of determining an increase in program execution speed in moving the program from a first processor system to a second processor system on an electronic computer executing a program stored in a non-transient medium, the method comprising the steps of:

(a) measuring multiple quantifiable execution properties of a given program to be evaluated describing how the given program executes on a first processor system as subject to a first optimization in the given program for the first processing system;

(b) applying the measured quantified execution properties to a model relating the measured quantified program properties to a change in execution speed when the given program is subject to a second optimization different from the first optimization second optimization making changes to the program necessary for the program to execute the second processor system and executed on the second processor system having a different architecture than the first processor system; and (c) before the second optimization of the given program for the second processing system, use the model to outputting an indication of expected execution speed of the given program on the second processor system to a user;

wherein the first processor system and the second processor system have different architectures characterized by different numbers of processing units and different types of processing units, wherein the model is derived from (1) a series of training set programs executable on the first and second processor systems, the training set of programs including corresponding pair portions optimized for different ones of the first and second processor system yet providing similar functions and (2) a determination of both of a change in execution speed between the corresponding pair portion when executed respectively on the first and second different processor systems and the multiple quantifiable execution properties of each corresponding pair portion.

14. The method of claim 13 wherein the first processor system is a general-purpose CPU and the second processor system is a specialized GPU.

15. The method of claim 13 including the steps of:

executing a series of training set programs on a current and target processor system, the training set of programs including corresponding pair portions optimized for different ones of the first and second processor systems yet providing similar functions;

determining a change in execution speed between the corresponding pair portion when executed, respectively, on the current and target processor system;

measuring the multiple quantifiable execution properties of each corresponding pair portion; and generating the model by relating the change in execution speed to the multiple quantified execution properties.

16. The method of claim 15 wherein the current processor system has the same architecture as the first processor system and the target processor has the same architecture as the second processor system.

17. The method of claim 15 wherein the multiple quantified program properties of corresponding pair portions are substantially the same, and are substantially different for different pair portions.

18. The method of claim 15 wherein a model is generated by linear regression.

19. The method of claim 18 wherein the linear regression uses regularized regression.

20. The method of claim 15 wherein the measured quantified execution properties are substantially micro-architecture independent with respect to the first and second processors.

21. The method of claim 20 wherein the measured multiple quantified execution properties include a measure of instruction level parallelism in the program to be evaluated.

* * * * *